United States Patent
Kula et al.

(10) Patent No.: US 10,054,175 B2
(45) Date of Patent: Aug. 21, 2018

(54) CONTROLLED CONTACT GUIDE PIN FOR VEHICLE DISC BRAKES

(71) Applicant: Kelsey-Hayes Company, Livonia, MI (US)

(72) Inventors: Peter Kula, Howell, MI (US); Shawn Berry, Northville, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 15/355,642

(22) Filed: Nov. 18, 2016

(65) Prior Publication Data

US 2018/0142742 A1    May 24, 2018

(51) Int. Cl.
*F16D 55/2265*    (2006.01)
*F16D 55/227*    (2006.01)

(52) U.S. Cl.
CPC ..... *F16D 55/22655* (2013.01); *F16D 55/227* (2013.01)

(58) Field of Classification Search
CPC ........... F16D 55/2265; F16D 55/22655; F16D 55/227; F16D 65/095; F16D 65/0087; F16D 65/0093; F16D 2055/007
See application file for complete search history.

(56) References Cited

U.S. PATENT DOCUMENTS

| | | | |
|---|---|---|---|
| 3,722,634 A | 3/1973 | Ogasawara et al. | |
| 3,744,367 A | 7/1973 | Lerich | |
| 4,308,938 A | 1/1982 | Denton | |
| 4,313,526 A | 2/1982 | Farr | |
| 4,372,428 A | 2/1983 | Delaunay et al. | |
| 4,458,790 A | 7/1984 | Hoffman, Jr. et al. | |
| 5,526,904 A | 6/1996 | Walden et al. | |
| 5,562,187 A * | 10/1996 | Tribuzio | F16D 55/22655 188/73.35 |
| 5,927,446 A | 7/1999 | Evans | |

(Continued)

FOREIGN PATENT DOCUMENTS

| CN | 1697942 A | 11/2005 |
|---|---|---|
| DE | 3032513 A1 | 4/1982 |

(Continued)

OTHER PUBLICATIONS

International Search Report, Application No. PCT/US2013/067731, dated Feb. 7, 2014.

(Continued)

*Primary Examiner* — Vishal R Sahni
(74) *Attorney, Agent, or Firm* — MacMillan, Sobanski & Todd, LLC (57) ABSTRACT

A guide pin, for a disc brake assembly, comprises a head portion and a stem. The stem extends from the head portion along an axis and has a circular cross section, a first stem portion, and a second stem portion. The first stem portion is adjacent a tip of the stem. The second stem portion is between the first portion and the head portion. The first stem portion has a first radius from the axis and the second stem portion has a second radius from the axis. The second radius is less than the first radius. A surface is on the first and second stem portions. A distance is from a plane to the surface. The plane is parallel to the surface and the axis is in the plane. The distance is less than the second radius.

20 Claims, 5 Drawing Sheets

(56) References Cited

U.S. PATENT DOCUMENTS

| | | | |
|---|---|---|---|
| 6,026,938 A | 2/2000 | Demoise, Jr. et al. | |
| 6,039,156 A | 3/2000 | Schneider | |
| 8,051,958 B1 | 11/2011 | Rockwell et al. | |
| 9,850,967 B2* | 12/2017 | Gerber | F16D 65/0006 |
| 2006/0049008 A1 | 3/2006 | Kinoshita et al. | |
| 2012/0067678 A1 | 3/2012 | Andrews et al. | |
| 2014/0116817 A1* | 5/2014 | Morais | F16D 55/2265 |
| | | | 188/73.45 |
| 2014/0231191 A1 | 8/2014 | Morals et al. | |
| 2014/0262636 A1* | 9/2014 | Gerber | F16D 55/22655 |
| | | | 188/73.44 |
| 2014/0262637 A1* | 9/2014 | Smith | F16D 65/0087 |
| | | | 188/73.44 |

FOREIGN PATENT DOCUMENTS

| | | |
|---|---|---|
| DE | 2705788 A1 | 8/1997 |
| DE | 202008006779 U1 | 7/2008 |
| DE | 102013011469 A1 | 1/2015 |
| EP | 0062403 A1 | 10/1982 |

OTHER PUBLICATIONS

European Extended Search Report, Application No. EP 13850823.9, dated May 31, 2016.
Chinese First Office Action, Application No. 201380062806.7, dated Oct. 26, 2016.

* cited by examiner

CONTROLLED CONTACT GUIDE PIN FOR VEHICLE DISC BRAKES

BACKGROUND OF INVENTION

This invention relates in general to vehicle disc brake assemblies and in particular to controlled contact guide pins adapted for use in such a vehicle disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

Typical disc brake assemblies include a rotor, a caliper, and an anchor bracket. The rotor is secured to the wheel of the vehicle for rotation therewith and includes a pair of opposed friction plates. The caliper includes a pair of brake shoes which are disposed on opposite sides of the brake rotor. The anchor bracket is attached to a non-rotatable component of the vehicle, such as the vehicle frame. The caliper is slidably supported on the anchor bracket by guide pins.

The brake shoes are connected to one or more hydraulically or pneumatically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

Each of the guide pins has a stem that extends into the bore. The stem has a substantially circular cross section of constant diameter that may also include at least one flat portion on an exterior surface on the stem. The flat portion extends along a length of the guide pin, reduces a cross sectional area of the guide pin, and permits grease and air to escape the bore when the guide pin is inserted in the bore. For efficiency in producing the guide pin, a single flat portion may be provided. Alternatively, multiple flat portions may be evenly spaced around a circumference of the guide pin to efficiently permit the grease and air to escape. For example, three flat portions may be provided at 120° increments on the circumference of the stem. Otherwise, no particular orientation of the at least one flat portion is preferred or established relative to the bore.

The anchor bracket bores have a greater diameter than the guide pins. Thus, the guide pins have a clearance between the exterior surface of the guide pin and an interior surface of the bore such that the guide pins may move within the bores and contact the interior surfaces of the bores. However, such contact between the guide pins and the interior surfaces of the bores produces noise, vibration, and harshness for the disc brake assembly. Thus, it would be desirable to reduce or control metal on metal contact between the guide pins and the interior surface of the bores.

SUMMARY OF INVENTION

This invention relates to a brake caliper guide pin having controlled contact and for use in a vehicle disc brake assembly.

According to one embodiment, a guide pin, for a disc brake assembly, may comprise, individually and/or in combination, one or more of the following features: a head portion and a stem. The stem extends from the head portion along an axis and has a circular cross section, a first stem portion, and a second stem portion. The first stem portion is adjacent a tip of the stem. The second stem portion is between the first portion and the head portion. The first stem portion has a first radius from the axis and the second stem portion has a second radius from the axis. The second radius is less than the first radius. A surface is on the first and second stem portions. A distance is from a plane to the surface. The plane is parallel to the surface and the axis is in the plane. The distance is less than the second radius.

According to this embodiment, the surface may be planar.

According to this embodiment, the guide pin may further comprises a formed edge around the surface.

According to this embodiment, the formed edge may be a crease.

According to this embodiment, the guide pin may further comprise at least one additional surface on the first stem portion; and a second distance from the at least one additional surface to at least one additional plane corresponding to the at least one additional surface, wherein the at least one additional plane is parallel to the at least one additional surface, the axis is in the at least one additional plane, and the second distance is less than the first radius and not less than the second radius.

According to this embodiment, the at least one additional surface may be planar.

According to this embodiment, the guide pin may further comprise second and third surfaces on the first stem portion; a second distance from a second plane to the second surface, wherein the second plane is parallel to the second and third surfaces and the axis is in the second plane; and a third distance from the second plane to the third surface, wherein the second and third distances are each less than the first radius and not less than the second radius.

According to this embodiment, the second and third surfaces may be planar.

According to this embodiment, the distance is a first distance, the second and third surfaces may be on opposite sides of the stem, and the first distance may be perpendicular to the second and third distances.

According to this embodiment, the guide pin may further comprise a bushing in a channel in the second stem portion, wherein the channel has a third radius that is less than the second radius.

According to this embodiment, the first and second stem portions may be concentric.

According to another embodiment, a disc brake assembly may comprise, individually and/or in combination, one or more of the following features: first and second guide pins, an anchor bracket, a brake caliper, and inboard and outboard brake shoes. Each of the first and second guide pins has a head portion and a stem. The stem extends from the head portion along an axis and has a circular cross section, a first stem portion, and a second stem portion. The first stem portion is adjacent a tip of the stem. The second stem portion is between the first portion and the head portion. The first stem portion has a first radius from the axis and the second stem portion has a second radius from the axis. The second radius is less than the first radius. A surface is on the first and second stem portions. A distance is from a plane to the surface. The plane is parallel to the surface and the axis is in the plane. The distance is less than the second radius. The anchor bracket has first and second bores. The first guide pin is slidably supported in the first bore and the second guide pin is slidably supported in the second bore. The brake caliper is secured to the first and second guide pins such that the surface of each of the first and second guide pins face in opposite directions. The inboard and outboard brake shoes are supported on the anchor bracket by clips.

According to this embodiment, the surface of each of the first and second guide pins may be planar.

According to this embodiment, each of the first and second guide pins may further have a formed edge around the surface.

According to this embodiment, each of the first and second guide pins may further have at least one additional surface on the first stem portion; and a second distance from the at least one additional surface to at least one additional plane corresponding to the at least one additional surface, wherein the at least one additional plane is parallel to the at least one additional surface, the axis is in the at least one additional plane, and the second distance is less than the first radius and not less than the second radius.

According to this embodiment, the at least one additional surface may be planar.

According to another embodiment, a guide pin, for a disc brake assembly, may comprise, individually and/or in combination, one or more of the following features: a head portion and a stem. The stem extends from the head portion along an axis and has a circular cross section, a first stem portion, and a second stem portion. The first stem portion is adjacent a tip of the stem. The second stem portion is between the first portion and the head portion. The first stem portion has a first radius from the axis and the second stem portion has a second radius from the axis. The second radius is less than the first radius. A surface is on the first and second stem portions. A distance is from the axis to the surface. The distance is less than the second radius.

According to this embodiment, the guide pin may further comprise a formed edge around the surface.

According to this embodiment, the guide pin may further comprise at least one additional surface on the first stem portion; and a second distance from the at least one additional surface to the axis, wherein the second distance is less than the first radius and not less than the second radius.

A potential and/or realized advantage of an embodiment of the invention is reduced noise, vibration, and harshness for the disc brake assembly. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
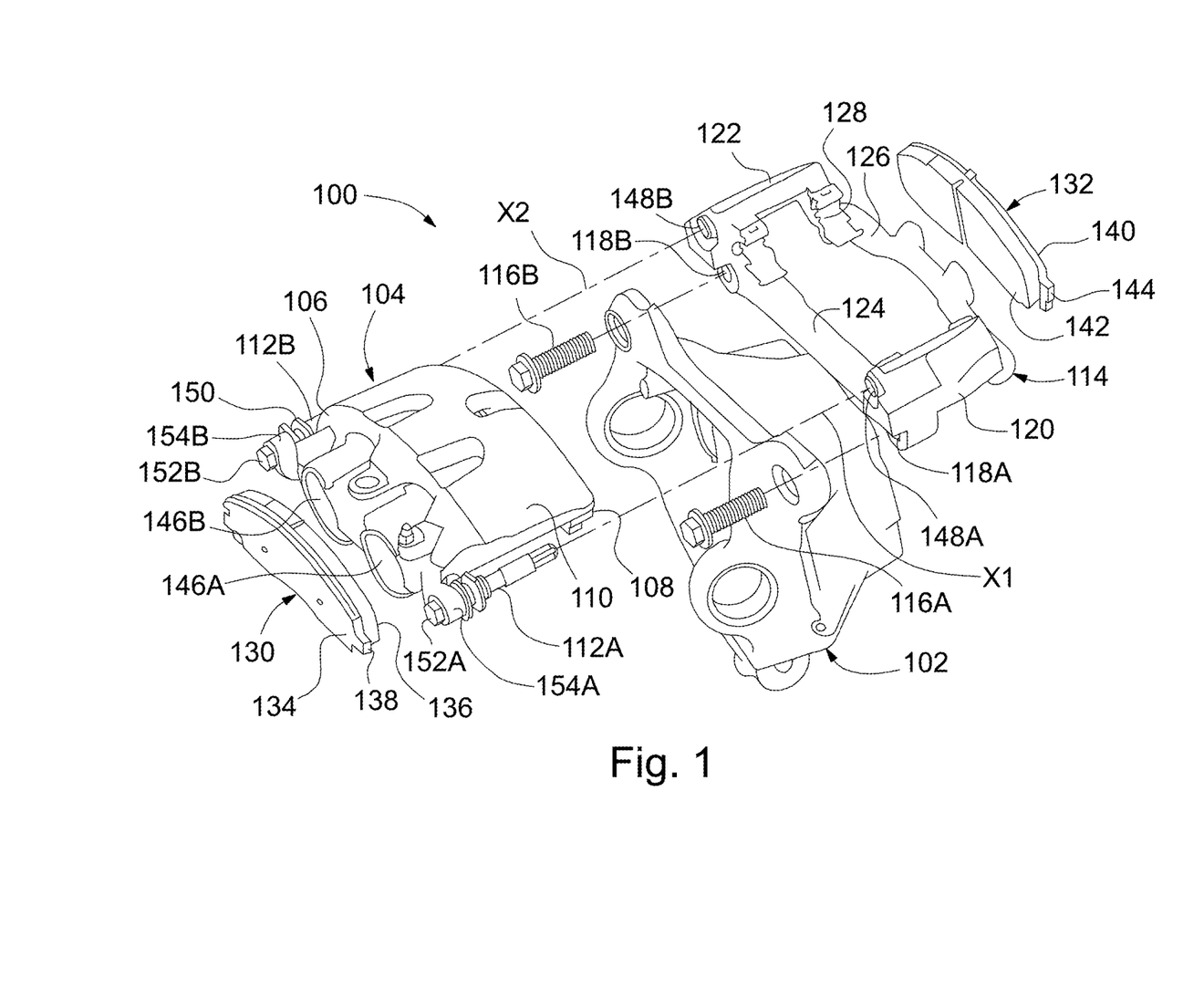
FIG. 1 is an exploded perspective view of a portion of a disc brake assembly having guide pins in accordance with a first embodiment of the present invention.

Referring now to FIG. 1, there is illustrated a portion of a vehicle disc brake assembly, indicated generally at 100, with a stationary component, indicated generally at 102, of a vehicle on which the disc brake assembly 100 is installed. The general structure and operation of the disc brake assembly 100 is conventional in the art. For example, the disc brake assembly 100 may be as disclosed in U.S. Patent Publication No. 2014/0231191 to Morais et al., the disclosure of which is incorporated herein by reference in entirety. Thus, only those portions of the vehicle disc brake assembly 100 which are necessary for a full understanding of this invention will be explained and illustrated in detail. Also, although this invention will be described and illustrated in connection with the particular vehicle disc brake assembly 100 disclosed herein, it will be appreciated that this invention may be used in connection with other vehicle disc brake assemblies, if so desired.

The disc brake assembly 100 is a pin guided or pin sliding type of disc brake assembly and includes a generally C-shaped caliper, indicated generally at 104. The caliper 104 includes an inboard leg portion 106 and an outboard leg portion 108 which are interconnected by an intermediate bridge portion 110. As will be discussed in detail, the caliper 104 is secured to first and second guide pins 112A and 112B, respectively, which are slidably supported on an anchor bracket, indicated generally at 114.

In turn, the anchor bracket 114 is secured to the stationary component 102 by suitable fasteners. For example, the anchor bracket 114 may be secured to the stationary component 102 by first and second bolts 116A and 116B, respectively. The first and second bolts 116A and 116B, respectively, are configured to be disposed in first and second threaded openings 118A and 118B, respectively, in the anchor bracket 114. The stationary component 102 may be, for example, a steering knuckle when the disc brake assembly 100 is installed for use on the front of the vehicle or an axle flange or drum-in-hat adapter when the disc brake assembly 100 is installed for use on the rear of the vehicle.

In the illustrated embodiment, the anchor bracket 114 includes first and second axially and outwardly extending arms 120 and 122, respectively. The first and second arms 120 and 122, respectively, are interconnected at their inboard ends by an inner tie bar 124 and at their outboard ends by an outer tie bar 126. The first and second arms 120 and 122, respectively, each have a pair of generally C-shaped channels formed thereon. Clips 128 are installed in each of the channels. The clips 128 are provided to slidably support an inboard brake shoe, indicated generally at 130, and an outboard brake shoe, indicated generally at 132, thereon.

In the illustrated embodiment, the inboard brake shoe 130 includes an inboard backing plate 134 and a friction pad 136. The inboard backing plate 134 includes opposed ends having tabs or protrusions 138 formed thereon and for supporting the inboard brake shoe 130 on the clips 128. Alternatively, the tabs 138 may be omitted or a different bearing component known to those skilled in the art may be used to support the inboard brake shoe 130. For example, pins may be used instead of the tabs 138.

Similarly, the outboard brake shoe 132 includes an outboard backing plate 140 and a friction pad 142. The outboard backing plate 140 includes opposed ends having tabs or protrusions 144 formed thereon and for supporting the outboard brake shoe 132 on the clips 128. Alternatively, the inboard brake shoe 130 can be supported on one or more brake pistons (not shown) of the disc brake assembly 100 and/or on the outboard leg portion 108 of the caliper 104, if so desired.

An actuation means is provided for operation of the disc brake assembly 100. For the disc brake assembly 100, the actuation means includes a pair of brake pistons (not shown), each of which is disposed in a first or second counterbore or recess 146A or 146B, respectively, formed in the inboard leg portion 106 of the caliper 104. The actuation means may be of a suitable type known to those skilled in the art. For example, the actuation means may be of a hydraulic, electrical, pneumatic, or mechanical type. When the actuation means is actuated, for example by a driver or a vehicle controller, a brake loading is developed on the disc brake assembly 100 and the disc brake assembly 100 moves from a non-braking position to a braking position.

The first guide pin 112A is disposed in a corresponding first non-threaded bore 148A in the first arm 120 of the anchor bracket 114. Similarly, the second guide pin 112B is disposed in a corresponding second non-threaded bore 148B in the second arm 122 of the anchor bracket 114. The first bore 148A has a first longitudinal axis X1 and the second bore 148B has a second longitudinal axis X2. A boot seal 150 may be installed in each of the openings in the caliper 104 through which the first and second guide pins 112A and 112B, respectively, extend. A first threaded fastener 152A secures the first guide pin 112A to the caliper 104. Similarly, a second threaded fastener 152B secures the second guide pin 112B to the caliper 104.

The first and second guide pins 112A and 112B, respectively, slidably support the caliper 104 on the anchor bracket 114. The first fastener 152A extends through a first opening in a first lug 154A of the caliper 104 and is installed in a corresponding internally threaded bore provided inside the first guide pin 112A. Similarly, the second fastener 152B extends through a second opening in a second lug 154B of the caliper 104 and is installed in a corresponding internally threaded bore provided inside the second guide pin 112B.

Referring now to FIGS. 2-7B, there is illustrated, in detail, a first embodiment of the first guide pin 112A in accordance with the present invention. As will be readily understood by one skilled in the art, description of the first guide pin 112A also applies to the second guide pin 112B unless otherwise noted. Reference numerals with "A" suffixes refer to the first guide pin 112A and reference numerals with "B" suffixes refer to the second guide pin 112B.

Figure 2:
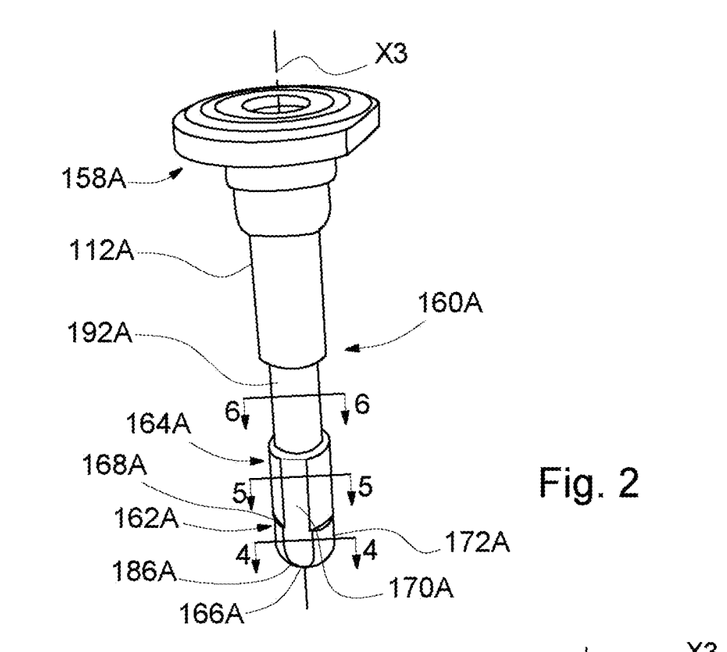
FIG. 2 is perspective view of one of the guide pins of FIG. 1.
Figure 3:
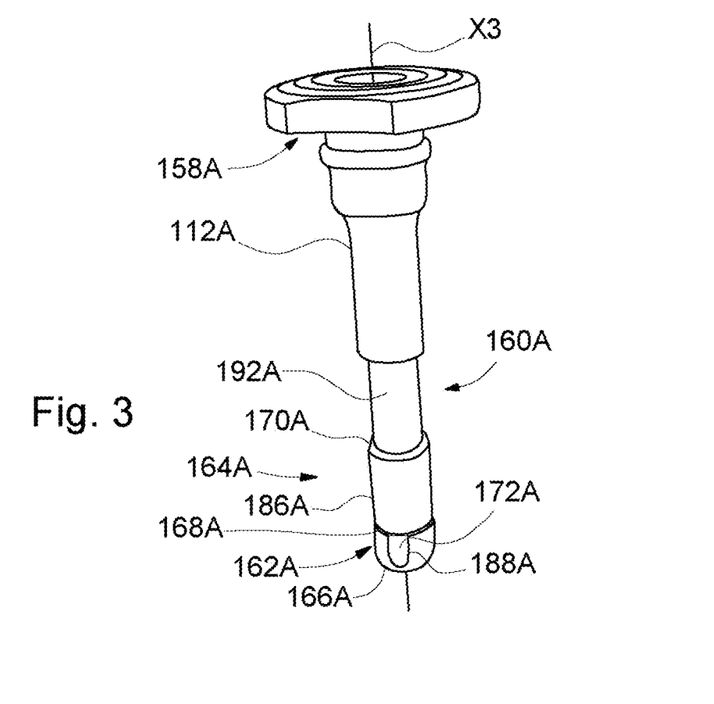
FIG. 3 is a second perspective view of the guide pin of FIG. 2.

The first guide pin 112A includes a head portion, indicated generally at 158A, a stem, indicated generally at 160A, and a longitudinal axis X3. In cross sections perpendicular to the longitudinal axis X3, the stem 160A is substantially circular. The stem 160A extends along the longitudinal axis X3 and has a first stem portion, indicated generally at 162A, and a second stem portion, indicated generally at 164A. The first stem portion 162A and the second stem portion 164A are concentric.

The first stem portion 162A extends from a dome-shaped tip 166A to a transition portion 168A between the first stem portion 162A and the second stem portion 164A. Between the tip 166A and the transition portion 168A, the first stem portion 162A has a first radius R1. The second stem portion 164A extends from the transition portion 168A to the head portion 158A. Between the transition portion 168A and the head portion 158A, the second stem portion 164A has a second radius R2. The second radius R2 is less than the first radius R1.

The first guide pin 112A further includes a first surface 170A, as well as second and third surfaces 172A and 174A, respectively, on a surface of the stem 160A. The second and third surfaces 172A and 174A, respectively, are similar but in different positions on the first stem portion 162A. The first, second, and third surfaces 170A, 172A, and 174A extend along the longitudinal axis X3. The first surface 170A is on both the first and second stem portions 162A and 164A, respectively, of the stem 160A whereas the second and third surfaces 172A and 174A, respectively, extend only on the first stem portion 162A and are not on the second stem portion 164A.

Figure 4:
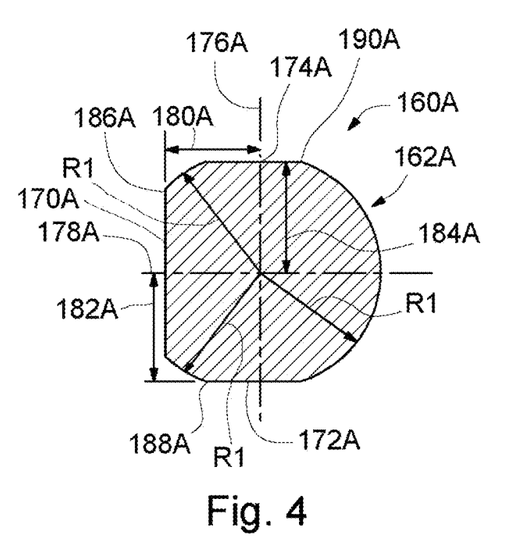
FIG. 4 is a sectional view taken along line 4-4 of FIG. 2.
Figure 5:
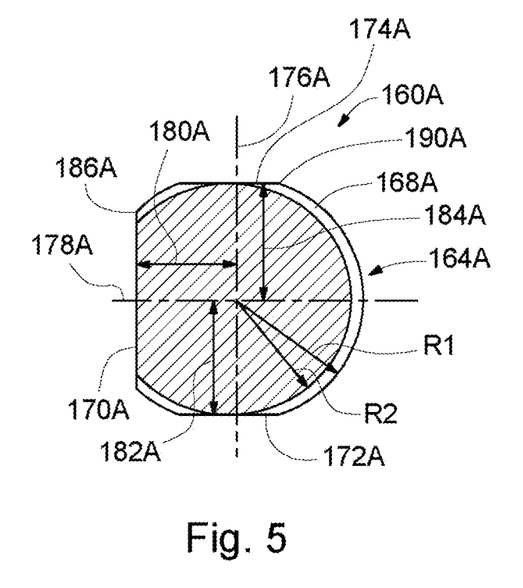
FIG. 5 is a sectional view taken along line 5-5 of FIG. 2.
Figure 6:
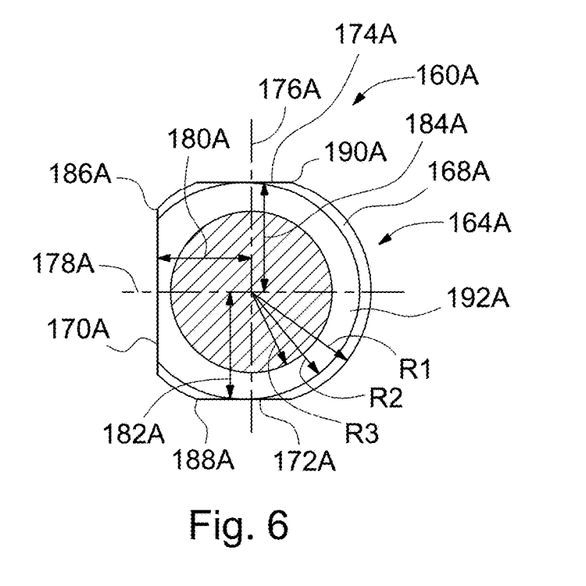
FIG. 6 is a sectional view taken along line 6-6 of FIG. 2.

As illustrated, the first, second, and third surfaces 170A, 172A, and 174A, respectively, are planar. In cross section, as shown in FIGS. 4-6, the first, second, and third surfaces 170A, 172A, and 174A, respectively, are linear and interrupt the otherwise substantially circular cross section of the stem 160A. However, as will be discussed, one or more of the first, second, and third surfaces 170A, 172A, and 174A, respectively, may be other than planar.

As shown in FIG. 4, a first reference plane 176A is parallel to the first surface 170A and a second reference plane 178A is parallel to the second and third surfaces 172A and 174A, respectively. The longitudinal axis X3 is in both the first reference plane 176A and the second reference plane 178A—i.e., the longitudinal axis X3 is at an intersection of the first and second reference planes 176A and 178A, respectively. For the first stem portion 162A, the first surface 170A is a first distance 180A from the first reference plane 176A, the second surface 172A is a second distance 182A from the second reference plane 178A, and the third surface 174A is a third distance 184A from the second reference plane 178A.

As illustrated, the first distance 180A is perpendicular to the second and third distances 182A and 184A, respectively. As such, the second and third surfaces 172A and 174A are on opposite sides of the stem 160A and ninety degrees from the first surface 170A. However, the first, second, and third distances 180A, 182A, and 184A, respectively, may be other than perpendicular.

The first, second, and third distances 180A, 182A, and 184A are less than the first radius R1. The first distance 180A is less than both the second and third distances 182A and 184A. As illustrated, the second and third distances 182A and 184A, respectively, are equal. However, the second and third distances 182A and 184A may be other than equal. Similarly, the second reference plane 178A may not be parallel to both the second and third surfaces 172A and 174A, respectively. In such a case, distances from the second surface 172A to a reference plane that is parallel to the second surface 172A and passing through the longitudinal axis X3 and from the third surface 174A to a reference plane that is parallel to the third surface 174A and passing through the longitudinal axis X3 are both greater than the first distance 180A.

As shown in FIG. 5, for the second stem portion 164A, the second radius is less than the first radius R1. The first distance 180A is less than both the first radius R1 and the second radius R2. The second and third distances 182A and 184A, respectively, continue to be less than the first radius R1 but are not less than the second radius R2.

As shown in FIGS. 4-6, there is a first formed edge 186A around the first surface 170A, a second formed edge 188A around the second surface 172A, and a third formed edge around the third surface 174A. The first, second, and third formed edges 186A, 188A, and 190A, respectively, are between the first, second, and third surfaces 170A, 172A, and 174A, respectively, and the surface of the stem 160A. As illustrated, each of the first, second, and third formed edges 186A, 188A, and 190A, respectively, are creases in the surface of the stem 160A. However, the first, second, and/or third formed edges 186A, 188A, and/or 190A, respectively, may be otherwise formed. For example, the first, second, and/or third formed edges 186A, 188A, and/or 190A may be formed as round or smooth transitions. The first, second, and third formed edges 186A, 188A, and 190A, respectively, may be formed by machining of the stem 160A or by another suitable method.

Figure 7A:
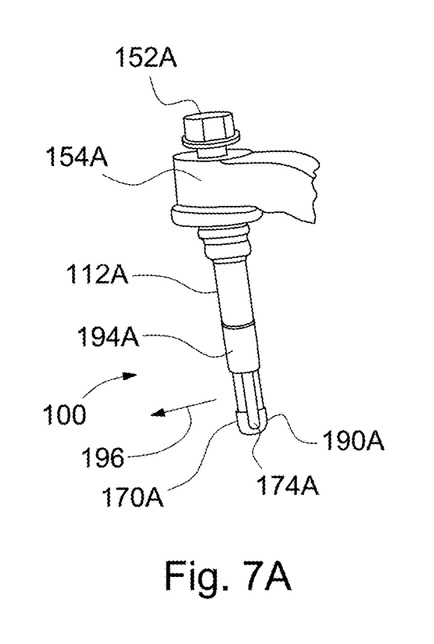
FIGS. 7A and 7B are partial perspective views of the disc brake assembly of FIG. 1.
Figure 7B:
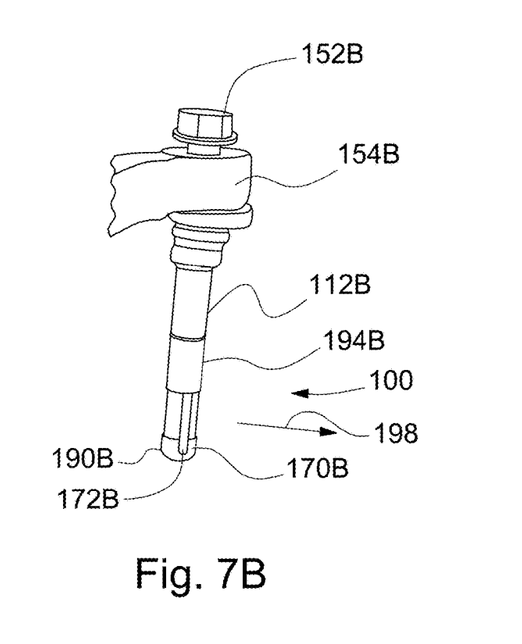

As shown in FIG. 6, the second stem portion 164A further includes an optional channel 192A configured to receive a bushing 194 (shown in FIGS. 7A and 7B). For example, the bushing may be an elastomeric bushing. The channel 192A has a third radius R3 that is less than the first radius R1, the second radius R2, the first distance 180A, the second distance 182A, and the third distance 184A.

As discussed, between the first stem portion 162A and the second stem portion 164A is a transition portion 168A. As illustrated, the transition portion 168A is in a plane normal to the longitudinal axis X3. However, the transition portion 168A may be other than in a plane normal to the longitudinal axis X3. For example, the transition portion 168A may be a taper or slope between the first stem portion 162A and the second stem portion 164A.

The first guide pin 112A is shown relative to the first lug 154A in FIG. 7A and the second guide pin 112B is shown relative to the second lug 154B in FIG. 7B. The first and second guide pins 112A and 112B, respectively, are oriented such that the first surface 170A of the first guide pin 112A faces in a first direction 196, a first surface 170B of the second guide pin 112B faces in a second direction 198, and the first and second directions 196 and 198, respectively, are opposite. This defines a first controlled contact point 200A on the first guide pin 112A where the first guide pin 112A contacts the first bore 148A and a second controlled contact point 200B on the second guide pin 112B where the second guide pin 112B contacts the second bore 148B.

As discussed, the first, second, and third surfaces 170A, 172A, and 174A, respectively, are planar and linear in cross section. However, at least one of the first, second, and third surfaces 170A, 172A, or 174A, respectively, may be other than planar and linear in cross section. For example, at least one of the first, second, and third surfaces 170A, 172A, or 174A, respectively, may be concave, convex, or comprise multiple linear segments in cross section. When the first surface 170A is convex, no distance from the first surface 170A to the longitudinal axis X3 exceeds the first or second radius R1 or R2, respectively.

Figure 8:
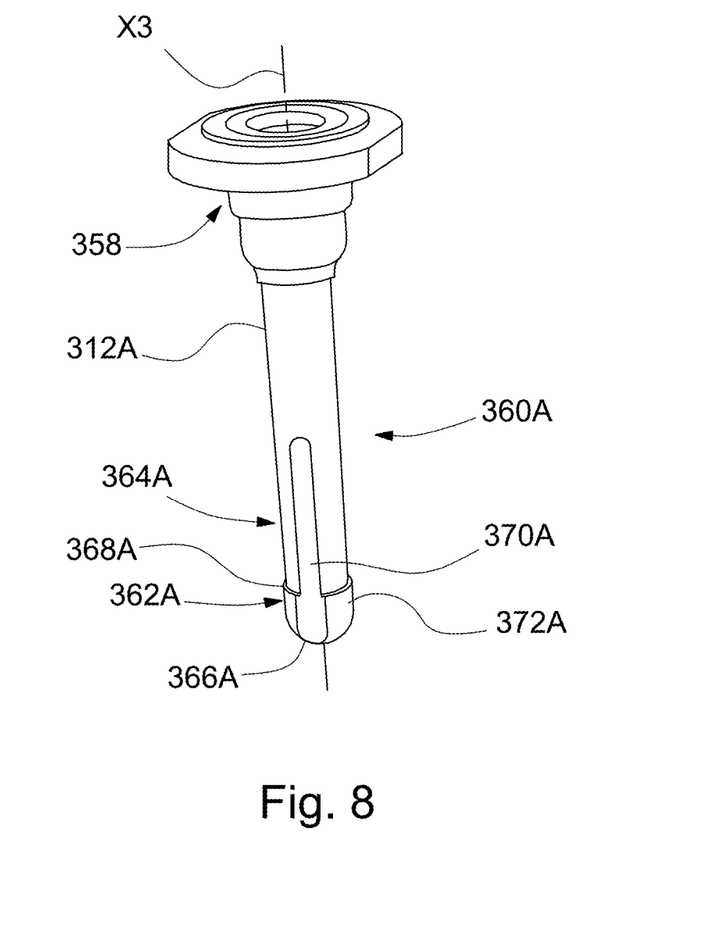
FIG. 8 is a perspective view of a guide pin in accordance with a second embodiment of the present invention.

Referring now to FIG. 8, there is illustrated a second embodiment of a first guide pin 312A in accordance with the present invention. Because the first guide pin 312A is a variation of the first guide pin 312A, like reference numerals, incremented by 200, designate corresponding parts in the drawings and detailed description thereof will be omitted. As is readily apparent, the first guide pin omits the optional channel for the bushing.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A guide pin for a disc brake assembly, the guide pin comprising:

a head portion;
a stem extending from the head portion along an axis and having a circular cross section, a first stem portion adjacent a tip of the stem, and a second stem portion between the first stem portion and the head portion, wherein the first stem portion has a first radius from the axis, the second stem portion has a second radius from the axis, and the second radius is less than the first radius;
a planar surface on the first and second stem portions, wherein the planar surface intersects an arcuate surface defined by the first radius; and
a distance from a plane to the planar surface, wherein the plane is parallel to the planar surface, the axis is in the plane, and the distance is less than the second radius.

2. The guide pin of claim 1 further comprising:
a formed edge around the planar surface.

3. The guide pin of claim 1 further comprising:
at least one additional surface on the first stem portion; and
a second distance from the at least one additional surface to at least one additional plane corresponding to the at least one additional surface, wherein the at least one additional plane is parallel to the at least one additional surface, the axis is in the at least one additional plane, and the second distance is less than the first radius and not less than the second radius.

4. The guide pin of claim 3 wherein the at least one additional surface is planar.

5. The guide pin of claim 1 further comprising:
second and third surfaces on the first stem portion;
a second distance from a second plane to the second surface, wherein the second plane is parallel to the second and third surfaces and the axis is in the second plane; and
a third distance from the second plane to the third surface, wherein the second and third distances are each less than the first radius and not less than the second radius.

6. The guide pin of claim 5 wherein the second and third surfaces are planar.

7. The guide pin of claim 1 further comprising:
a bushing in a channel in the second stem portion, wherein the channel has a third radius that is less than the second radius.

8. The guide pin of claim 1 wherein the first and second stem portions are concentric.

9. The guide pin of claim 1 further comprising:
an anchor bracket having a bore, wherein the guide pin is slidably supported in the bore;
a brake caliper secured to the guide pin; and
inboard and outboard brake shoes supported on the anchor bracket by clips.

10. The guide pin of claim 1, wherein the planar surface has a first width on the first stem portion and a second width on the second stem portion, the first width is transverse to the axis, the second width is parallel to the first width, and the first width is greater than the second width.

11. A disc brake assembly comprising:
first and second guide pins, wherein each of the first and second guide pins has
a head portion,
a stem extending from the head portion along an axis and having a circular cross section, a first stem portion adjacent a tip of the stem, and a second stem portion between the first stem portion and the head portion, wherein the first stem portion has a first radius from the axis, the second stem portion has a second radius from the axis, and the second radius is less than the first radius,
a planar surface on the first and second stem portions, wherein the planar surface intersects a circumference defined by the first radius, and
a distance from a plane to the planar surface, wherein the plane is parallel to the planar surface, the axis is in the plane, and the distance is less than the second radius;
an anchor bracket having first and second bores, wherein the first guide pin is slidably supported in the first bore and the second guide pin is slidably supported in the second bore;
a brake caliper secured to the first and second guide pins such that the planar surface of each of the first and second guide pins face in opposite directions; and
inboard and outboard brake shoes supported on the anchor bracket by clips.

12. The disc brake assembly of claim 11 wherein each of the first and second guide pins further have:
a formed edge around the planar surface.

13. The disc brake assembly of claim 11 wherein each of the first and second guide pins further have:
at least one additional surface on the first stem portion; and
a second distance from the at least one additional surface to at least one additional plane corresponding to the at least one additional surface, wherein the at least one additional plane is parallel to the at least one additional surface, the axis is in the at least one additional plane, and the second distance is less than the first radius and not less than the second radius.

14. The disc brake assembly of claim 13 wherein the at least one additional surface is planar.

15. A guide pin for a disc brake assembly, the guide pin comprising:
a head portion;
a stem extending from the head portion along an axis and having a circular cross section, a first stem portion adjacent a tip of the stem, and a second stem portion between the first stem portion and the head portion, wherein the first stem portion has a first radius from the axis, the second stem portion has a second radius from the axis, and the second radius is less than the first radius;
a planar first surface on the first and second stem portions, wherein the first surface intersects an arcuate surface defined by the first radius;
second and third surfaces on the first stem portion;
a first distance from a first plane to the first surface, wherein the first plane is parallel to the first surface, the axis is in the first plane, and the first distance is less than the second radius;
a second distance from a second plane to the second surface, wherein the second plane is parallel to the second and third surfaces and the axis is in the second plane; and
a third distance from the second plane to the third surface, wherein the second and third distances are each less than the first radius and not less than the second radius, the second and third surfaces are on opposite sides of the stem, and the first distance is perpendicular to the second and third distances.

16. The guide pin of claim 15 wherein the second and third surfaces are symmetric across the second plane.

17. The guide pin of claim 15 wherein the second and third distances are equal to the second radius.

18. The guide pin of claim 15 wherein the first surface intersects a second arcuate surface defined by the second radius.

19. The guide pin of claim 15 wherein the second and third surfaces intersect the arcuate surface defined by the first radius.

20. The guide pin of claim 15 wherein the first distance is perpendicular to the first surface, the second distance is perpendicular to the second surface, and the third distance is perpendicular to the third surface.

* * * * *